US011958619B2

(12) United States Patent
Lunerti et al.

(10) Patent No.: US 11,958,619 B2
(45) Date of Patent: Apr. 16, 2024

(54) AIRCRAFT PROVIDED WITH A SECONDARY FLIGHT ASSEMBLY

(71) Applicant: RPS AEROSPACE s.r.l., Lumezzane (IT)

(72) Inventors: Giacomo Lunerti, Vicenza (IT); Nausicaa Asia Vezzoli, Bollate (IT); Andrea Berna, Lumezzane (IT)

(73) Assignee: RPS AEROSPACE S.R.L., Lumezzane (IT)

( * ) Notice: Subject to any disclaimer, the term of this patent is extended or adjusted under 35 U.S.C. 154(b) by 427 days.

(21) Appl. No.: 16/485,846

(22) PCT Filed: Feb. 27, 2018

(86) PCT No.: PCT/IB2018/051236
§ 371 (c)(1),
(2) Date: Aug. 14, 2019

(87) PCT Pub. No.: WO2018/158686
PCT Pub. Date: Sep. 7, 2018

(65) Prior Publication Data
US 2020/0017224 A1    Jan. 16, 2020

(30) Foreign Application Priority Data
Mar. 1, 2017   (IT) .................. 102017000022745

(51) Int. Cl.
*B64D 17/72* (2006.01)
*B64C 39/02* (2023.01)
(Continued)

(52) U.S. Cl.
CPC ............ *B64D 17/72* (2013.01); *B64C 39/024* (2013.01); *B64D 17/02* (2013.01); *B64D 17/26* (2013.01);
(Continued)

(58) Field of Classification Search
CPC .. B64D 17/72; B64D 17/025; B64D 2201/00; B64D 17/02; B64D 17/26; B64D 17/34;
(Continued)

(56) References Cited

U.S. PATENT DOCUMENTS 3,796,398 A    3/1974  Eilertson
6,322,021 B1 *  11/2001  Fisher ...................... B64D 5/00
                                                   244/49

(Continued)

FOREIGN PATENT DOCUMENTS

EP    0 716 015 A2    6/1996
EP    3 093 239 A1    11/2016
(Continued)

OTHER PUBLICATIONS

International Search Report, dated Jun. 28, 2018 (5 pages).
(Continued)

*Primary Examiner* — Peter M Poon
*Assistant Examiner* — Marisa V Conlon
(74) *Attorney, Agent, or Firm* — Jacobson Holman PLLC

(57) ABSTRACT

A remote piloted aircraft comprising a secondary flight assembly adapted to intervene in case of failure or an emergency of the aircraft, said secondary flight assembly being provided with an additional control unit configured to process flight relevant data and which includes an additional receiver configured to receive commands from the remote pilot by means of a remote control unit, in case of failure or emergency said additional control unit being configured to generate, as a response, an activation command adapted to activate a first device to expel an upper wing placed in a first compartment of the aircraft and to inflate a lower wing housed in a second compartment of the aircraft, and also to (Continued)

generate an interdiction command of the primary propulsion unit, said upper wing being maneuverable by means of a further remote control unit.

12 Claims, 10 Drawing Sheets

(51) Int. Cl.
| | | |
|---|---|---|
| *B64D 17/02* | (2006.01) | |
| *B64D 17/26* | (2006.01) | |
| *B64D 17/34* | (2006.01) | |
| *B64D 25/00* | (2006.01) | |
| *B64D 27/24* | (2006.01) | |
| *B64U 10/13* | (2023.01) | |
| *B64U 70/83* | (2023.01) | |
| *B64D 35/02* | (2006.01) | |
| *B64D 35/04* | (2006.01) | |
| *B64U 50/19* | (2023.01) | |

(52) U.S. Cl.
CPC ............. *B64D 17/34* (2013.01); *B64D 25/00* (2013.01); *B64D 27/24* (2013.01); *B64D 35/02* (2013.01); *B64D 35/04* (2013.01); *B64D 2201/00* (2013.01); *B64U 10/13* (2023.01); *B64U 50/19* (2023.01); *B64U 70/83* (2023.01)

(58) Field of Classification Search
CPC . B64C 2201/185; B64C 39/024; B64U 70/83; B64U 10/13
See application file for complete search history.

(56) References Cited

U.S. PATENT DOCUMENTS

| | | | |
|---|---|---|---|
| 6,416,019 B1 | 7/2002 | Hilliard et al. | |
| 6,808,144 B1 | 10/2004 | Nicolai et al. | |
| 7,487,939 B1* | 2/2009 | Christof | ................. B64D 25/12 |
| | | | 244/139 |
| 8,565,981 B2* | 10/2013 | Filias | ..................... B64C 25/56 |
| | | | 701/45 |
| 8,979,023 B1* | 3/2015 | Wang | .................... B64D 45/00 |
| | | | 244/100 A |
| 9,033,281 B1* | 5/2015 | Adams | .................... B64D 9/00 |
| | | | 244/190 |
| 9,613,539 B1* | 4/2017 | Lindskog | ................. G08G 5/04 |
| 10,737,794 B2* | 8/2020 | Lee | ................ B64C 39/02 |
| 2007/0145193 A1 | 6/2007 | Hakki et al. | |
| 2011/0315806 A1 | 12/2011 | Piasecki et al. | |
| 2016/0332739 A1* | 11/2016 | Wong | .................... B64D 25/00 |

FOREIGN PATENT DOCUMENTS

| | | |
|---|---|---|
| WO | 2006/073750 A2 | 7/2006 |
| WO | 2016/204803 A1 | 12/2016 |

OTHER PUBLICATIONS

Written Opinion of the International Searching Authority, dated Jan. 2015 (6 pages).
IAI, Birdeye 650D, Sep. 19, 2016 [retrieved Mar. 28, 2023]. https://www.youtube.com/watch?v=F3QAstLDoME.
UAE Search Report and Examination Report.

* cited by examiner

AIRCRAFT PROVIDED WITH A SECONDARY FLIGHT ASSEMBLY

BACKGROUND OF THE INVENTION

The present invention relates to an aircraft provided with a secondary flight assembly.

Remotely piloted aircraft (RPA), more commonly known as drones, are known. There are also known by other acronyms in English: in addition to RPA (Remotely Piloted Aircraft), they may be known as UAV (Unmanned Aerial Vehicle), RPV (Remotely Piloted Vehicle), ROA (Remotely Operated Aircraft) or UVS (Unmanned Vehicle System).

They are aircraft characterized by the absence of human pilot aboard. Their flight is controlled by a computer aboard the aircraft, under the remote control of a navigator or pilot on the ground. Their use is now consolidated for military purposes and increasing also for civil applications, e.g. for fire prevention and fighting emergencies, for non-military security purposes, for pipeline surveillance, for remote sensing and research purposes, and, more in general, in all cases in which such systems they can allow the conduction of "dull, dirty and dangerous" missions, often at much lower cost than traditional aircraft.

Drones are often equipped with rescue apparatuses aimed at recovering the aircraft in case of failure. For example, U.S. Pat. No. 6,416,019 describes a recovery apparatus with parachute for recovering a drone without damage, allowing a safe, non-destructive landing of the drone in a desired position. The recovery apparatus with parachute comprises a parachute, a servo system and an electronic guidance control system. The parachute, which is rectangular in shape, is connected by a plurality of control cables to the servo system, which in turn is controlled by the electronic control system. The electronic control system and the servo system are used to control the glide path and provide a safe, non-destructive landing of the drone. In particular, the servo system is adapted to adjust the length of each cable of said plurality of control cables connected to the parachute, for controlling the parachute so as to modify the speed and direction.

However, such recovery apparatus with a parachute is complex in its implementation since it operates using a high number of control cables of the parachute itself and also does not allow the pilot to be able to continue controlling the drone in order to complete the mission. Furthermore, there is no certainty that it will not suffer damage by crashing into obstacles or even be a danger for the people on the ground.

SUMMARY OF THE INVENTION

It is the object of the present invention to provide a recovery apparatus which is simple to implement and which allows a safe landing for both the drone and for people on the ground, and also allows the pilot to continue the mission underway.

The upper wing and the lower wing ensure the flight of the aircraft instead of the propellers in the event of failure of the aircraft or in the event of an emergency.

DESCRIPTION OF THE DRAWINGS

These and other features of the present invention will be more apparent from the following detailed description of a practical embodiment thereof, shown by way of non-limiting example in the accompanying drawings, in which.

DETAILED DESCRIPTION OF THE DRAWINGS

Figure 1:
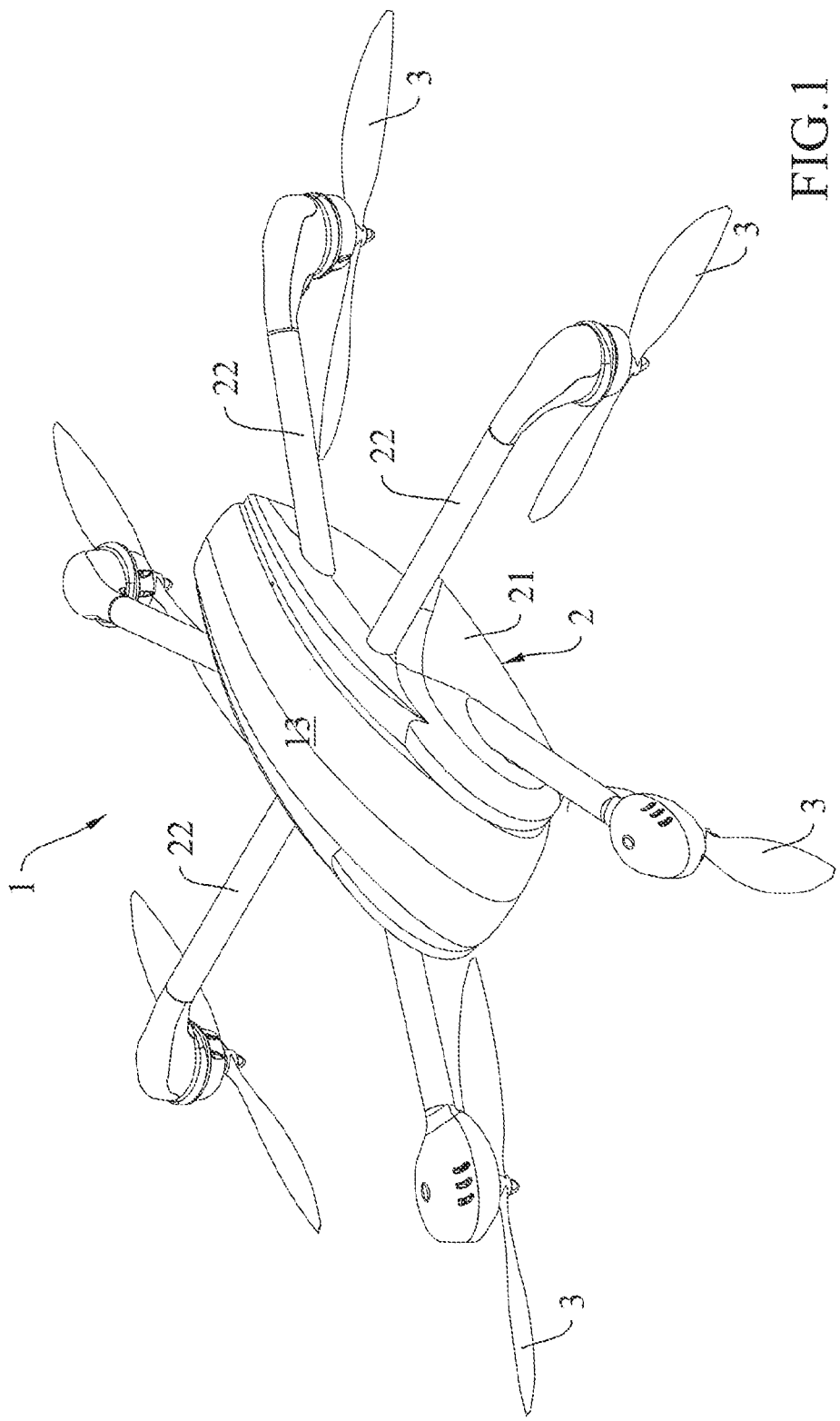
FIG. 1 shows a first axonometric view of a remote control aircraft, according to the present invention.

FIG. 1 shows a Remotely Piloted Aircraft (RPA) 1 according to the present invention.

The aircraft 1 comprises a frame 2 which is the supporting structure, it being possible to make said frame 2 of various materials, including plastic, aluminum or carbon. As known, the composition of the frame 2 is decisive in determining the strength, weight and therefore the flight time of the aircraft 1. In the same manner, also the size of the frame 2, and therefore its diameter, affect the aerial performance of the aircraft 1: a larger diameter ensures greater flight stability, but at the same time implies more weight and therefore more energy consumption. In the preferred embodiment, the frame 2 comprises a central body 21 from which a plurality of mutually equidistant branches 22 radially depart.

Figure 10:
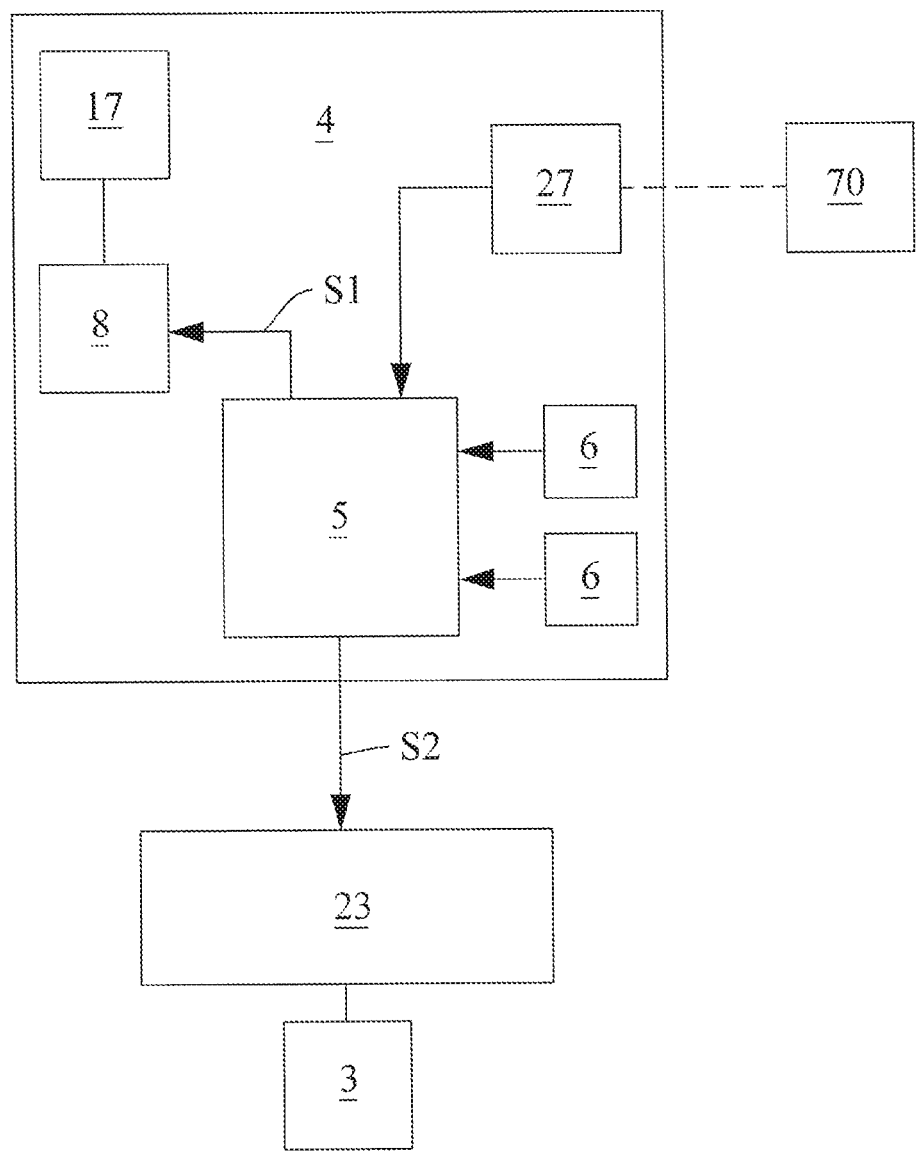
FIG. 10 shows a block chart of a secondary flight assembly comprised in the aircraft in FIG. 1.

The aircraft 1 comprises a primary propulsion unit 23 (FIG. 10), which in turn comprises at least one motor arranged to rotate a plurality of propellers 3. For example, the aircraft 1 may comprise a plurality of motors, each located on one of said branches 22, said motors being adapted to rotate a propeller 3 each, allowing the aircraft 1 to lift off the ground. The motors installed on drones are electric motors and typically of the "brushless" type. Alternatively, the aircraft 1 may comprise a single motor adapted to rotate said plurality of propellers 3 by means of respective mechanical transmission elements.

The accompanying drawings show an aircraft 1 which comprises six propellers 3 (hexacopter), but there may be three motors on the aircraft 1 (tricopter), four motors (quadcopter), eight motors (octocopter), etc.

The aircraft 1 comprises a main control unit constituted by a controller configured to receive commands from a remote control unit and to maintain the aircraft 1 balanced in flight, among other things, by acting automatically according to information derived from hardware and software with which it is equipped. The remote control unit can be a remote control transmitter, by means of which a remote pilot can control the primary propulsion unit 23, and therefore the flight of the aircraft 1. Alternatively, the remote control unit may be a land station or an apparatus capable of programming an automatic flight.

The main control unit interfaces with an inertial measurement unit, or IMU, which comprises a set of electronic components, such as GPS antennas, barometers, inertial measurement instruments, such as gyroscopes and accelerometers, which allow the control unit to improve the response to sudden variations of the factors which are recorded.

The main control unit is configured to receive from said inertial measurement unit a plurality of flight related data deriving from the measurements made by the inertial measurement unit itself and to process them to determine the implementation of one or more actions on the aircraft 1.

The main control unit further comprises at least one receiver configured to receive in input the commands from the remote control unit of the primary propulsion unit 23 to control the flight of the aircraft 1.

Additionally, the aircraft 1 comprises a secondary flight assembly 4 adapted to intervene in the event of failure of the aircraft 1 or in case of emergency.

The secondary flight assembly 4 comprises an additional control unit 5 (FIG. 10) constituted by an autonomous control unit, also configured to process flight related data, because it is provided with an additional inertial measurement unit comprising a plurality of sensors 6 adapted to detect a series of magnitudes, among which at least the acceleration (linear and angular) to which is the aircraft 1 is subjected, and the ambient pressure, in particular the pressure differences which can be generated as a consequence of a sudden change in altitude of the aircraft 1. In the case in point, the additional control unit 5 is configured to compare said quantities received from said additional inertial measurement unit with the limit values which identify a failure condition of the aircraft 1 in order to recognize the latter.

The secondary flight assembly 4 is then provided with an additional receiver 27 configured to receive in input the commands coming from an additional remote control unit 70 of the flight of the aircraft 1. Again, the additional remote control unit 70 may be a transmitter radio control, a land station or an apparatus capable of programming an automatic flight. In the case of radio control, for example, the additional remote control unit 70 may be integrated on the device itself together with the remote control unit.

The additional control unit 5 is also configured to monitor the radio signal strength which puts in communication the aircraft 1 with the remote control unit 70, e.g. a Ground Control Station (GCS), and to compare said radio signal strength with a threshold value which identifies an emergency condition.

Furthermore, the additional control unit 5 is configured to recognize an emergency command by means of said remote control unit 70, e.g. the pressing an emergency button with which the radio control unit 70 is provided, a fault of the sensors 6 of the additional inertial measurement unit or a rotation speed of the propellers 3 which exceeds a given safety limit (so-called "rotorcraft overlimit").

As discussed in greater detail below, in the event of failure of the aircraft 1 or in the event of an emergency, the additional control unit 5 is configured to generate as response an activation command S1 and at the same time an interdiction command S2 to interdict the primary propulsion unit 23.

Figure 3:
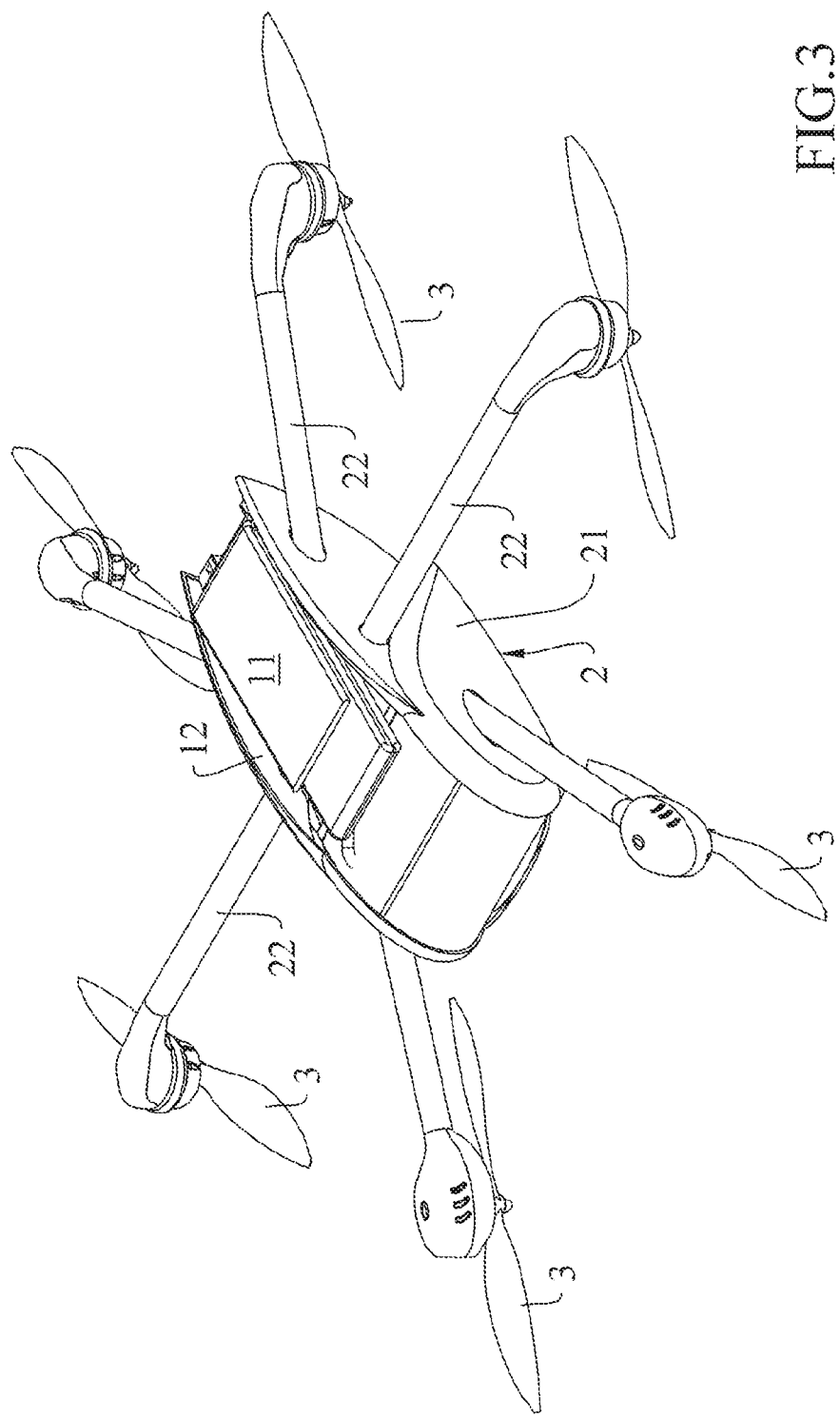
FIGS. 3 and 4 show a view of the aircraft of FIG. 1 without one or more portions of the frame.

The secondary flight assembly 4 comprises a first device 8 adapted to eject an upper wing 9 placed inside a first compartment 12 (FIG. 3) in the upper part of the central body 21 of the aircraft 1, said upper wing 9 being maneuverable by control means connected to said additional control unit 5, said control means being controlled by said remote control unit 70.

The first device 8 may be, for example, an emergency parachute pneumatic launching device, like that described in patent EP-0716015. In such device, a quick exhaust valve is opened by means of a command and releases a compressed gas stored in a small tank fitted with a pressure gage. The tank contains air, nitrogen or non-flammable gases. The escape of the gas instantaneously inflates an expansion chamber, which by extending confers a rectilinear motion at variable acceleration to a parachute which detaches, despite remaining constrained to the aircraft structure by means of a plurality of cables.

Figure 4:
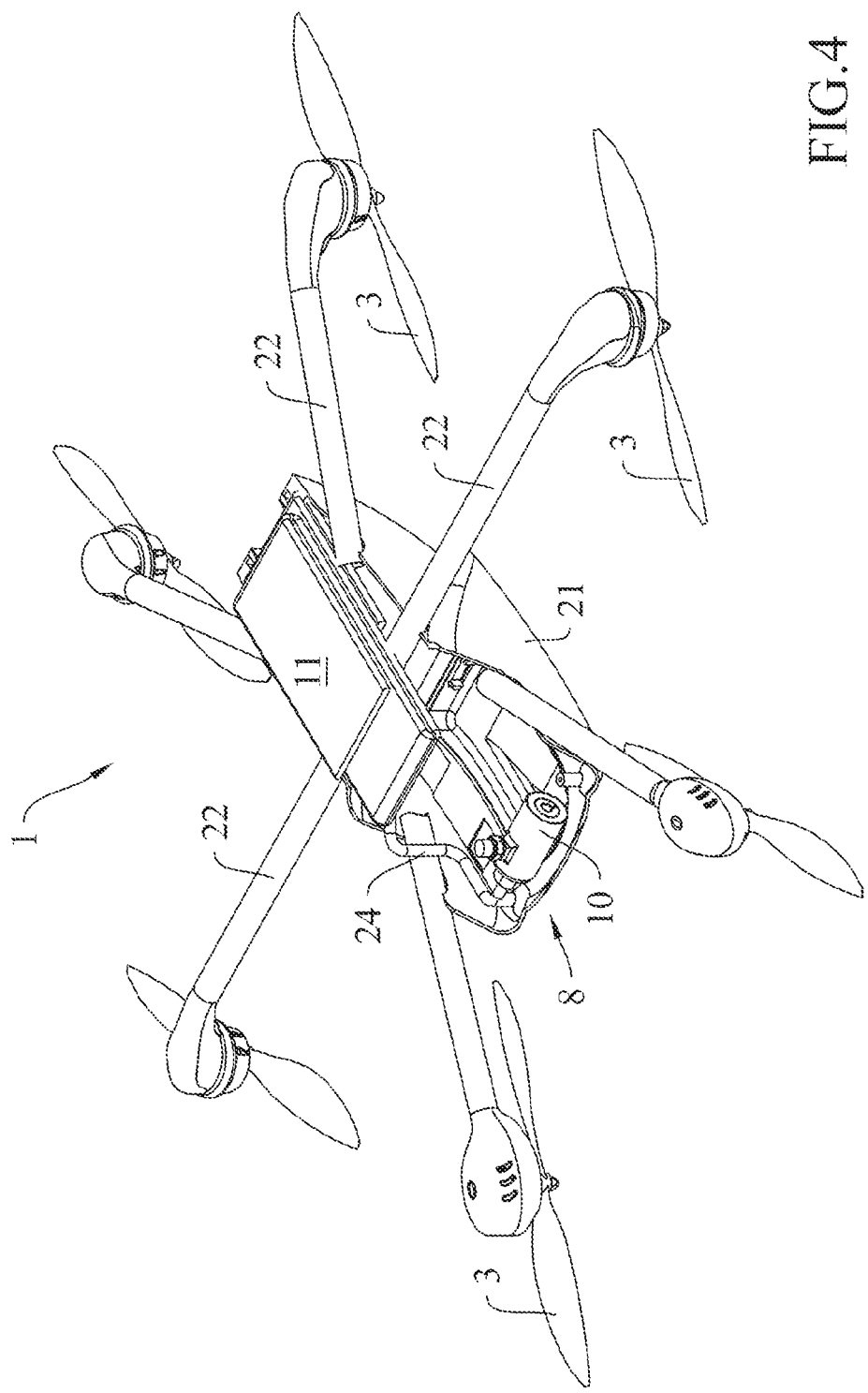

Similarly, the first device 8 comprises a tank 10 (FIG. 4) inside which a compressed fluid is stored at high pressure (for example, at a pressure of over 160 bar), said tank 10 being provided with a quick exhaust valve adapted to be electromechanically activated by said activation command S1 generated by the additional control unit 5 in the event of failure of the aircraft 1 or in the event of an emergency.

Figure 6:
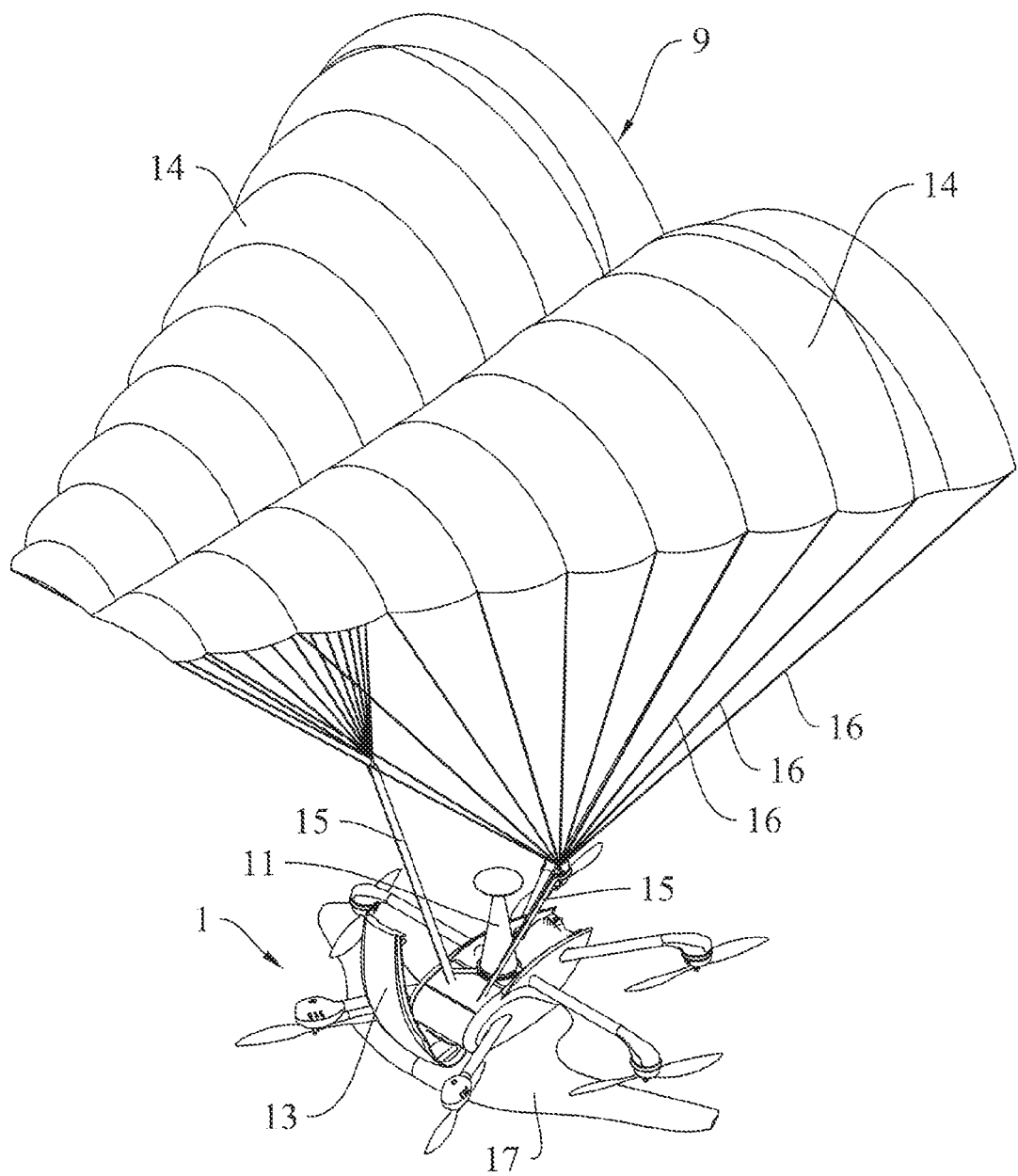
FIGS. 6-8 show views of the aircraft in FIG. 1 in the configuration assumed in the event of failure of the aircraft or in an emergency.

In the event of failure of the aircraft 1 or in the event of an emergency, said valve is configured to release said compressed fluid contained in the tank 10 inside an expansion chamber 11 which is folded bellows-like inside said first compartment 12 of the aircraft 1, by means of a pipe 24 able to support the generated pressure. The bellows-like expansion chamber 11 is adapted to inflate rapidly because of the high pressure introduced into it by the tank 10, assuming the shape of a cone (or of a tank) for expelling and the deploying the upper wing 9 (FIG. 6). The first compartment 12 is placed in the upper part of the aircraft 1 and comprises a closing cover 13 (FIG. 1) hinged to the frame 2 of aircraft 1, said cover 13 being adapted to open under the instantaneous thrust bias from the inside of the expansion chamber 11.

Figure 7:
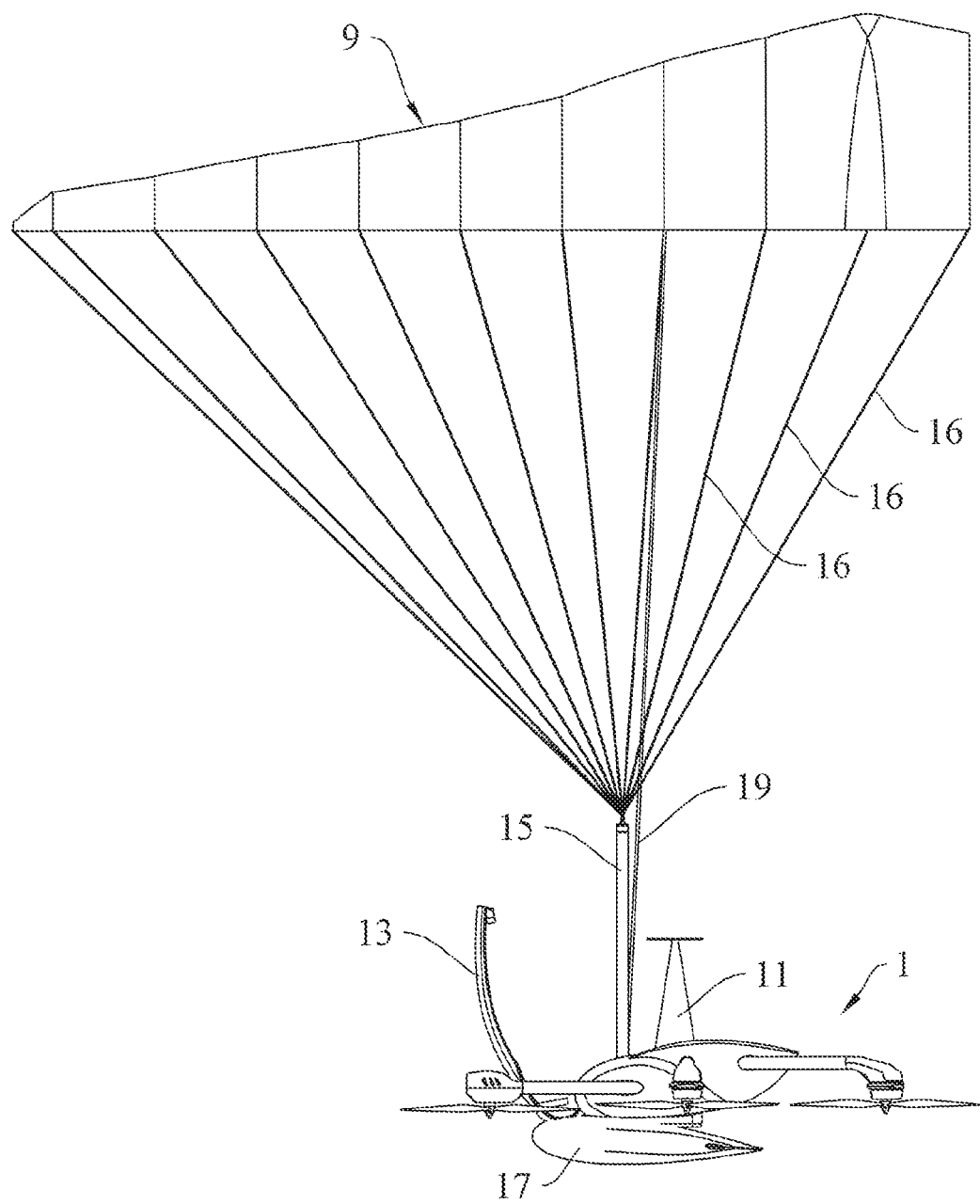
Figure 8:
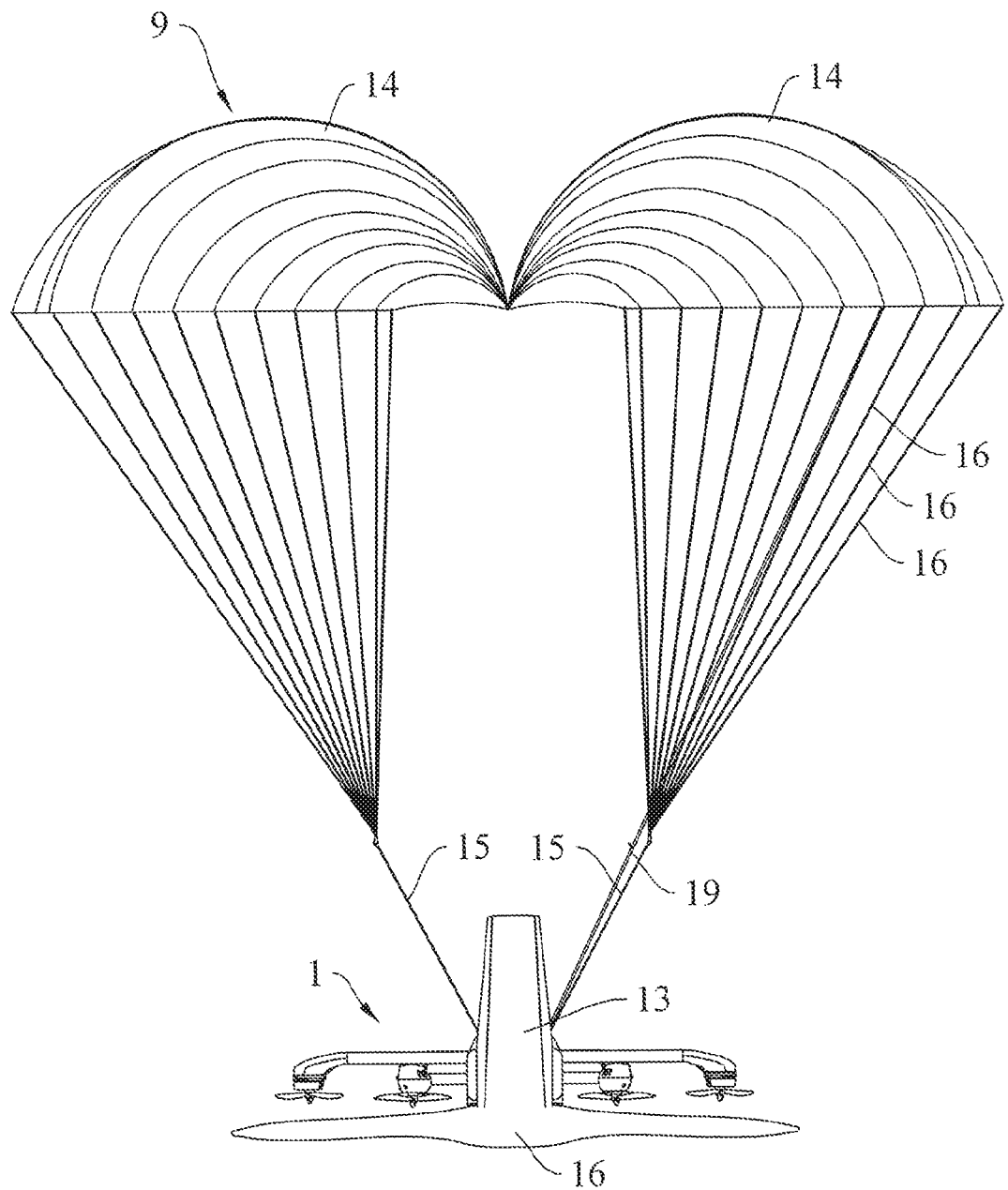

In particular, said upper wing 9 is made of fabric or other material with flexible properties and mainly consists of two semi truncated cone shaped surfaces 14 with the two joined vertexes (FIGS. 6-8). A wing of this kind is also known with the name of "Rogallo wing". Said upper wing 9 is attached to a frame 2 of the aircraft 1 by means of a pair of cables 15, which in turn brunch out into a plurality of cables 16 connected to the upper wing 9 along its perimeter, said upper wing 9 also envisaging a directional cable 19 adapted to connect at least one point of the perimeter of the upper wing 9 to said control means. The control means are adapted to apply traction to said directional cable 19 by means of a remote command received from the additional remote control unit 70, to deform the structure of the upper wing 9, and thus maneuver it, as will be explained in greater detail below.

Figure 2:
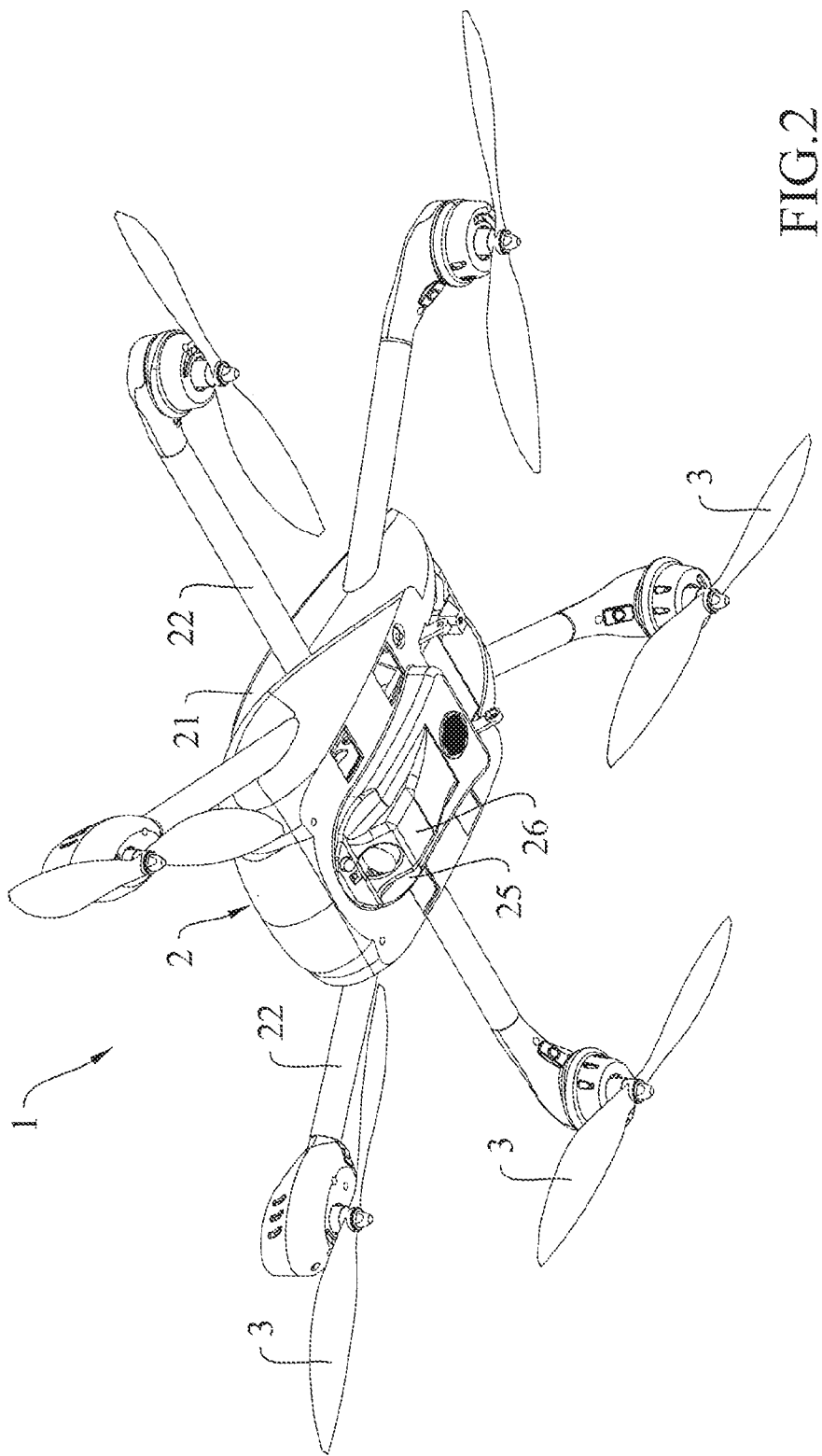
FIG. 2 shows a second axonometric view of the aircraft in FIG. 1.
Figure 5:
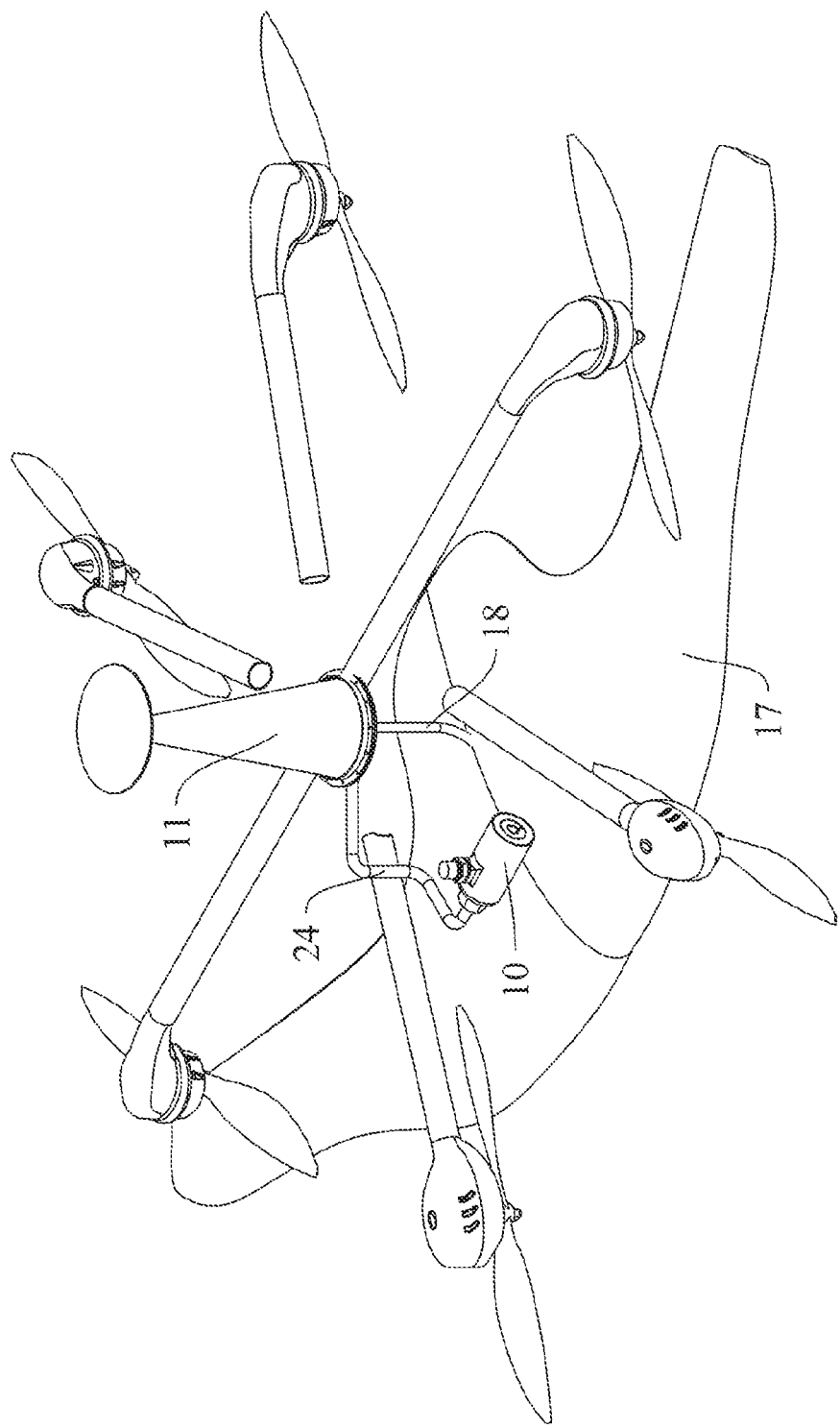
FIG. 5 shows an axonometric, partial section view of the aircraft in FIG. 1 in a configuration assumed in the event of failure.

The secondary flight assembly 4 further comprises an inflatable lower wing 17 (FIG. 5) housed in a second compartment 25 of the aircraft 1 and which is adapted to be also used in case of failure of the aircraft 1, said lower wing 17 being in fluid communication with the expansion chamber 11 through an outlet channel 18; the second compartment 25 is located below the central body 21 of the aircraft 1 and also comprises a closing cover 26 (FIG. 2). The lower wing 17 is inflated by means of the fluid previously used to inflate the expansion chamber 11. Indeed, the expansion chamber 11, after expelling the upper wing 9, contains the same volume of the fluid as the tank 10 expanded at a lower pressure (e.g. at a pressure of 2 bar), said fluid flows towards said outlet channel 18 and inflates the lower wing 17 which, by virtue of the acquired volume, opens the closing cover 26 and is positioned underneath to the aircraft 1 (FIG. 5).

The lower wing 17 is shaped to cooperate with the upper wing 9 to the stability of the aircraft; in this way, the pilot can manage the maneuver appropriately. In other words, the lower wing is shaped to cooperate with the upper wing 9 so as to stabilize the aircraft flight. For example, the lower wing 17 may have a standardized airfoil shape type defined by the National Advisory Committee for Aeronautics NACA. Furthermore, the lower wing 17 also acts as an airbag is capable of protecting the most detrimental parts of the aircraft 1 from impacts with objects or people.

In the event of failure of the aircraft 1 or in the event of an emergency, the secondary flight assembly 4 is therefore adapted to activate said first device 8 to expel the upper wing 9 and adapted to inflate said lower wing 17. In particular, the additional control unit 5 is configured to generate said activation command S1 when, after comparing the data received from the additional inertial measurement unit (at least linear and angular acceleration and ambient pressure) with these limit values, it recognizes a failure condition of aircraft 1, or when the radio signal strength which puts the aircraft 1 into communication with the additional remote control unit 70 falls below the limit value which identifies the emergency condition; said activation command S1 is also generated when a fault is detected in the additional inertial measurement unit or a rotation speed of the propellers 3 which exceeds said predetermined safety limit. The additional control unit 5 is configured to generate said actuation command S1 also when it receives an emergency command from the remote control unit 70.

At the same time as the activation command S1, the additional control unit 5 is configured to generate said interdiction command S2 of the primary propulsion unit 23 adapted to interrupt the rotation of the propellers 3, in order to ensure that the expelled upper wing 9 does not become entangled with the propellers 3 themselves.

The upper wing 9 and the lower wing 17 are shaped to permit a continuous turn of the aircraft 1 (rightwards or leftwards), while by means of the remote traction of said directional cable 19 it is possible to generate a rectilinear trajectory condition or a turn condition in the opposite direction compared to the one imposed by the upper wing 9, whereby modifying the shape of the upper wing 9 itself. It is easy to understand how said control means are easy to implement because they act on a single cable (the directional cable 19); this also means greater security because it is more difficult for a single cable to become entangled with the rest of the structure of the upper wing 9 when it opens.

Figure 9:
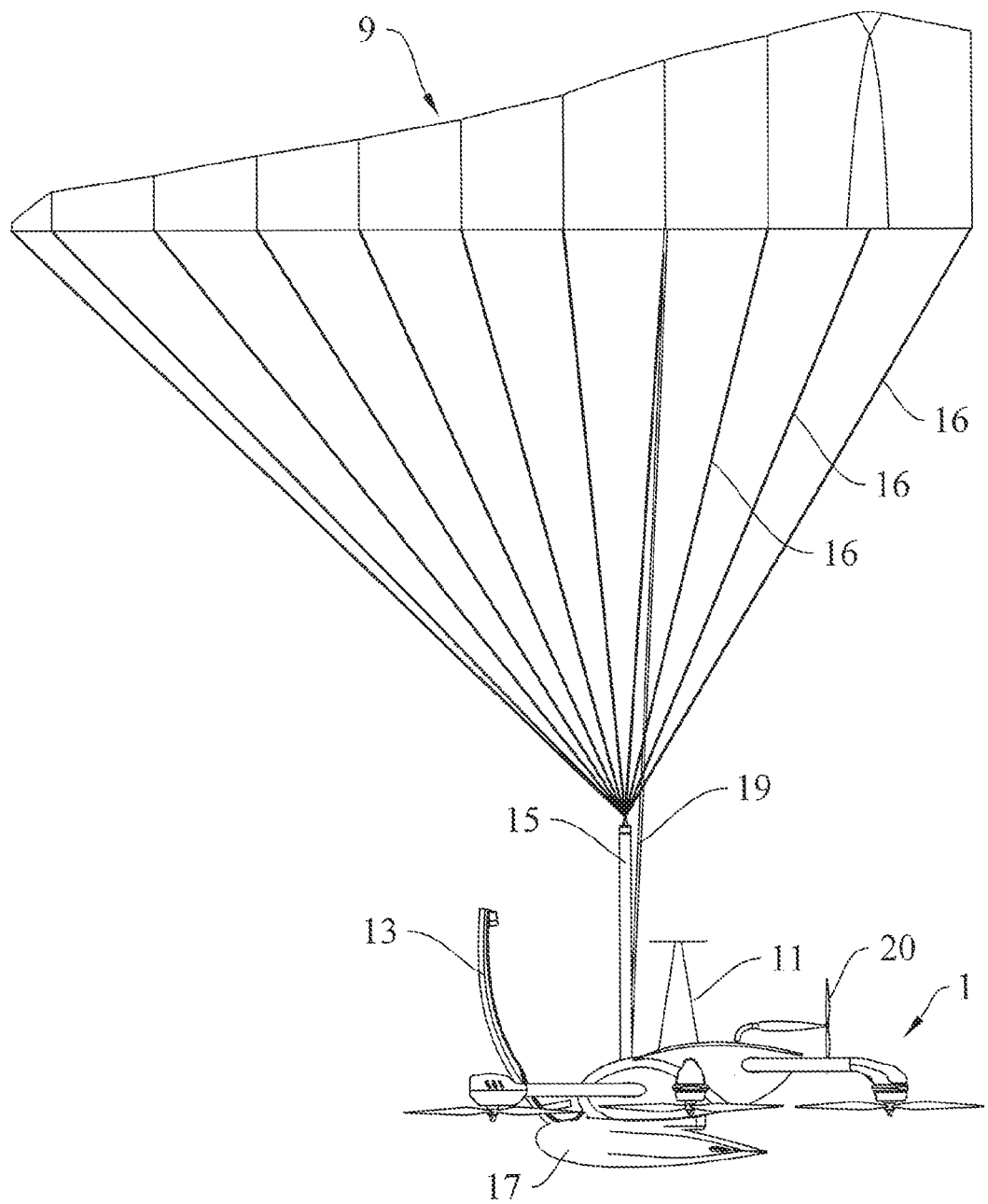
FIG. 9 shows a side view of a remote control aircraft, according to the present invention provided with propulsive propeller.

The secondary flight assembly 4 may comprise a further propulsive propeller 20 (FIG. 9) also controlled by the remote control unit 70 and operating on a plane perpendicular to the roll axis of the aircraft 1, said additional propulsive propeller 20 generating an increase in the lift force, will allow the aircraft 1 to continue the mission. The action of this increase of thrust will also produce a further increase in maneuvering stability of the aircraft 1, with the consequent capability to fly trajectories in presence of strong head or side winds.

During operation, when the control unit detects a failure condition of aircraft 1 or an emergency, an actuation command S1 is generated at the same time, adapted to activate said first device 8 for expelling the upper wing 9 and inflating the lower wing 17, and an interdiction command S2 adapted to stop the primary propulsion unit 23 of the aircraft 1.

As mentioned, the failure condition is detected by comparing flight data, and in particular magnitudes such as at least acceleration (linear and angular) and ambient pressure, with limit values which identify the failure condition, or the emergency condition is detected by comparing the radio signal strength with the additional remote control unit 70 with said limit value which identifies the emergency condition. Furthermore, said actuation command S1 and interdiction command S2 are generated by the additional control unit 5 also in the case of emergency command, or if failures to the additional inertial measurement unit or rotorcraft overlimit conditions are detected.

The upper wing 9 is expelled by virtue of the opening of the valve to rapidly exhaust of the tank 10 which, by releasing the compressed fluid inside the expansion chamber 11 initially folded inside the first compartment 12, causes this by extending to open the cover 13 of the first compartment 12 and confers a rectilinear motion to the upper wing 9 which deploys in air, while remaining constrained to the aircraft 1 by means of the pair of cables 15 and their extensions (cables 16).

After the expulsion of the primary wing, by virtue of said outlet channel 18, the volume of fluid contained inside the expansion chamber 11 flows at a lower pressure inside the lower wing 17, whereby inflating it (FIG. 5).

Once the secondary fluid assembly 4 is activated, the upper wing 9 together with the lower wing 17 generates a continuous turn of the aircraft 1 (rightwards or leftwards), while by means of the remote control unit 70 it will be possible to generate a rectilinear trajectory condition or a turn condition in the opposite direction with respect to that imposed by the upper wing 9, whereby modifying the shape of the upper wing 9. This is by virtue of the control means which apply traction to the directional cable 19 to deform the structure of the upper wing 9, so that the aircraft 1 may continue to be maneuvered and continue the mission begun, despite the failure or emergency condition.

In the case of additional propulsive propeller 20, again by means of the additional remote control unit 70, it is also possible to increase the thrust force of the aircraft 1, and thus its maneuverability, by virtue of the secondary flight assembly 4.

The aircraft 1 will remain perfectly maneuverable by virtue of the synergistic action of said upper and lower wings 9, 17, whereby allowing to cope with a possible failure of the aircraft 1 or an emergency in controlled manner which is absolutely harmless for people under the aircraft 1, the aircraft 1 itself remaining perfectly controllable.

The invention claimed is:

1. A remote piloted aircraft comprising a primary propulsion unit with at least one engine to put in rotation a plurality of propellers and a main control unit comprising at least one receiver to receive commands from a remote control unit,
   wherein the aircraft has a secondary flight assembly to intervene in case of failure or emergency of the aircraft,
   wherein the secondary flight assembly is provided with an additional control unit to process data relevant to the flight and which includes an additional receiver to receive commands from a further remote control unit,
   wherein in case of failure or emergency, the additional control unit will generate, as a response to failure or emergency, an activation command to activate a first device for the expulsion of an upper wing placed in a first compartment of the aircraft and to inflate a lower wing housed in a second compartment of the aircraft, and also to generate an interdiction command of the primary propulsion unit,
   wherein the lower wing is inflated by compressed fluid contained in a tank of the aircraft,
   wherein the upper wing is maneuverable by the further remote control unit,
   wherein the lower wing is shaped to cooperate with the upper wing for the stability of the flight of the aircraft,
   wherein the lower wing when inflated is positioned underneath the aircraft.

2. The aircraft according to claim 1, wherein the additional control unit is provided with a plurality of sensors for detecting a series of magnitudes including linear and angular acceleration the aircraft is subjected to and the ambient pressure,
> wherein the additional control unit will compare the magnitudes to limit values that identify a failure condition of the aircraft and recognize the failure conditions, and activate the activation command and the interdiction command.

3. The aircraft according to claim 2, wherein the additional control unit recognizes an emergency command including a fault in the sensors or an aircraft speed that exceeds a given safety limit by means of the further remote control unit, and in response generates the activation command and interdiction command.

4. The aircraft according to claim 1, wherein the additional control unit is configured to monitor the power of a radio signal that connects the aircraft with the further remote control unit and for comparing the power of the radio signal with a limit value that indicates an emergency condition which activates the activation command and interdiction command.

5. The aircraft according to claim 1, wherein the first device comprises an expansion chamber and folded bellows inside the first compartment of the aircraft and is connected to the tank of compressed fluid,
> wherein the tank is provided with a quick exhaust valve to be electromechanically activated by the activation control activated by the additional control unit,
> wherein in case of failure or emergency of the aircraft, the quick exhaust valve releases the compressed fluid contained in the tank within the expansion chamber which rapidly inflates due to high pressure introduced therein from the tank and assumes the shape of a cone or cylinder to expell and deploy the upper wing.

6. The aircraft according to claim 5, wherein the inflatable lower wing is in fluid communication with the expansion chamber through an output channel,
> wherein the lower wing is inflated by fluid previously used for inflating the expansion chamber.

7. The aircraft according to claim 1, wherein the upper wing is made of fabric or other material with properties of flexibility and is composed of two semi truncated cone shaped surfaces which are connected to each other,
> wherein the upper wing is connected to a frame of the aircraft by means of a pair of cables which branch out into a plurality of cables connected to the upper wing along its perimeter,
> wherein the upper wing has only one directional cable which connects the control means to at least one point of the upper wing perimeter.

8. The aircraft according to claim 7, wherein the upper wing is maneuverable by the control means connected to the additional control unit,
> wherein the control means control traction of the directional cable to determine the shape of the upper wing by a remote command received from the further remote control unit.

9. The aircraft according to claim 7, wherein the upper wing and the lower wing are shaped to generate a continuous right or left turn of the aircraft,
> wherein traction of the directional cable can generate a rectilinear trajectory condition or a turn condition in an opposite direction compared to a direction imposed by the upper wing.

10. The aircraft according to claim 1, wherein the lower wing has an airfoil shape as defined by the National Advisory Committee for Aeronautics.

11. The aircraft according to claim 1, wherein the lower wing is a wing-shaped airbag suitable to protect parts of the aircraft against impacts with objects or people.

12. The aircraft according to claim 1, wherein the secondary flight assembly comprises a further propulsive propeller also controlled by the remote control unit and operating in a plane which is perpendicular to the aircraft roll axis,
> wherein the further propulsive propeller generates an increase in lift force.

\* \* \* \* \*